No. 643,433. Patented Feb. 13, 1900.
G. W. WHITE.
COFFEE POT.
(Application filed Dec. 7, 1899.)
(No Model.)
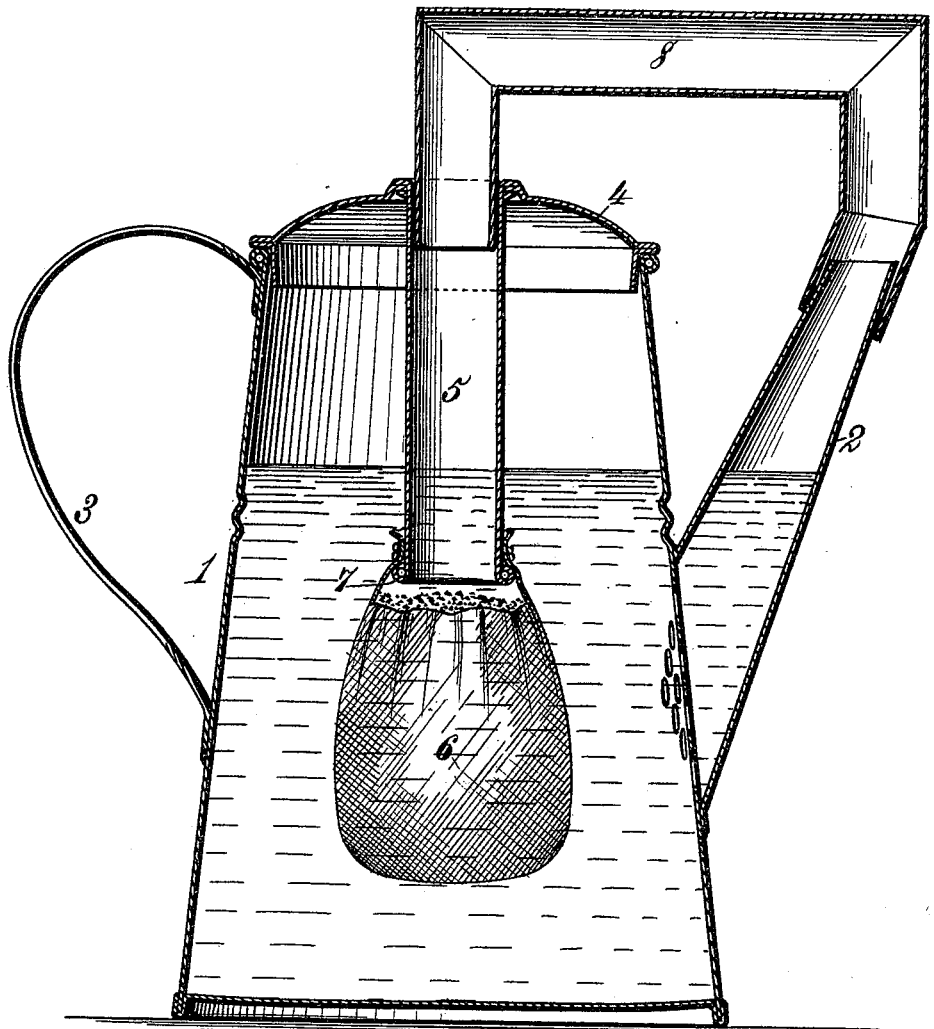
Witnesses.
Robert Everett,
F. B. Keefer
Inventor:
George W. White.
By James L. Norris.
Atty.

UNITED STATES PATENT OFFICE.

GEORGE W. WHITE, OF CHATTANOOGA, TENNESSEE.

COFFEE-POT.

SPECIFICATION forming part of Letters Patent No. 643,433, dated February 13, 1900.

Application filed December 7, 1899. Serial No. 739,544. (No model.)

*To all whom it may concern:*

Be it known that I, GEORGE W. WHITE, a citizen of the United States, residing at Chattanooga, in the county of Hamilton and State of Tennessee, have invented new and useful Improvements in Coffee-Pots, of which the following is a specification.

My invention relates to coffee-pots, the object of the same being to provide a coffee-pot which may be used for making ordinary boiled coffee and which is adapted to make what is known as "distilled" coffee.

The invention consists of a pot having a depending tube on the lid thereof provided with means for attaching a bag or receptacle for pulverized coffee and a coupling-tube for connecting the end of the spout with the upper end of the tube on said lid.

The invention also consists in certain features and details of construction and combinations of parts, which will be more fully hereinafter described and claimed.

In the drawing forming part of this specification the figure is a vertical central sectional view of my improved pot.

The body 1 of the pot is formed with the usual spout 2 and handle 3 and has a lid 4 fitting the upper end thereof. The said lid is formed with a central opening, with which communicates a tube 5, secured to the under side of said lid and extending when the lid is in place down into the body 1 of the pot. The tube 5 is provided at its lower end with means for attaching thereto a bag or receptacle 6 for ground or pulverized coffee. The specific means of attachment herein shown consists in an outwardly-extending flange 7, around which the draw-strings of the bag 6 are adapted to be passed and tied. In connection with the parts above described I employ a coupling-tube 8 for connecting the upper open end of the spout 2 with the upper end of the tube 5 in the lid 4. The opposite angularly-extending ends of the coupling-tube are adapted to fit, respectively, the upper ends of the spout 2 and tube 5, so that when desired said coupling-tube may be readily removed from the pot or applied thereto.

If the pot is intended to be used for ordinary boiled coffee, the coupling-tube 8 is dispensed with and the process of making the coffee carried out in the usual manner. If, however, it is desired to make what is known as "distilled" coffee, the pot is filled to the proper height with water, the bag 6 containing the coffee-grounds is tied to the lower end of the tube 5, and the lid 4 placed upon the top of the body 1. When the lid 4 is in place, the bag 6 containing the coffee-grounds dips beneath the surface of the water in the body 1. The coupling-tube is now applied by connecting the opposite ends thereof with the upper end of the spout 2 and the upper end of the tube 5, respectively. As soon as the water in the pot reaches the boiling-point the steam generated passes up through the spout 2 and into the coupling-tube 8, where it is either wholly or partially condensed, and the water of condensation passes down through the tube 5, through the coffee-grounds, and back into the body 1 of the pot. In so doing it extracts all of the aroma and fragrance from the coffee and produces a beverage which is perfectly clear and extremely palatable, besides being of the requisite strength for use.

It will be observed that the operation of the device is automatic throughout, as after the ingredients of the coffee have been introduced into the pot in the manner described and the parts thereof connected as shown in the drawing the only thing necessary is to apply heat to bring the water in the pot to the boiling-point.

Having now described my invention, what I claim as new, and desire to secure by Letters Patent, is—

1. A coffee-pot, having a depending open-end tube secured to the lid thereof, and a coupling-tube for connecting the spout of the pot with said depending tube, as and for the purpose set forth.

2. A coffee-pot, having a depending open-end tube secured to the lid thereof and provided with means at its lower end for the attachment of a receptacle for ground coffee, and a coupling-tube for connecting the spout of the pot with said depending tube, as and for the purpose set forth.

3. A coffee-pot, having a depending open-end tube secured to the lid thereof and provided with flanges at its lower end for the attachment of a bag containing ground coffee, and a coupling-tube for connecting the spout of said pot with said depending tube, as and for the purpose set forth.

In testimony whereof I have hereunto set my hand in presence of two subscribing witnesses.

GEORGE W. WHITE.

Witnesses:
FRANK C. MCGHEE,
JOHN GREENLEES.